United States Patent [19]

Engelsmann et al.

[11] 3,707,904
[45] Jan. 2, 1973

[54] PHOTOGRAPHIC APPARATUS WITH BRAKING MEANS FOR ROLL FILM

[75] Inventors: Dieter Engelsmann; Fritz Kessler, both of 8025 Unterhaching; Dieter Mass; Kurt Zattler, both of 8 Munich 90, all of Germany

[73] Assignee: Agfa-Gevaert Aktiengesellschaft, Leverkusen, Germany

[22] Filed: July 26, 1971

[21] Appl. No.: 165,911

[30] Foreign Application Priority Data

July 30, 1970 Germany............................G 70 28 784.2

[52] U.S. Cl..........................95/31 R, 352/221, 353/95
[51] Int. Cl............................G03b 1/48, G03b 17/28
[58] Field of Search ..95/31 R, 31 CA; 352/221, 225, 352/227; 353/95

[56] References Cited

UNITED STATES PATENTS

| | | | |
|---|---|---|---|
| 3,380,361 | 4/1968 | Winkler | 95/31 R |
| 2,192,692 | 3/1940 | Nerwin | 95/31 R |
| 2,144,258 | 1/1939 | Flaherty | 352/227 |
| 3,103,861 | 9/1963 | Koeppe | 95/31 R |
| 3,311,037 | 3/1967 | Winkler et al. | 95/31 R X |
| 2,395,590 | 2/1946 | Simmon et al. | 95/31 R |
| 2,903,953 | 9/1959 | Meixner | 95/31 R |
| 1,728,670 | 9/1929 | Dina | 352/221 |

*Primary Examiner*—Joseph F. Peters, Jr.
*Attorney*—Michael S. Striker

[57] ABSTRACT

A still camera wherein a spring-biased pressure plate is mounted on a movable wall of the housing and is provided with apertures adjacent to the marginal portions of roll film which is guided in a channel in front of the pressure plate. The movable wall further supports a spring-biased plate-like carrier which is located behind the pressure plate and is provided with braking members extending through the apertures of the pressure plate and into the channel to engage the respective marginal portions of roll film in the channel and to prevent uncontrolled lengthwise movements of the film. The braking members have convex film-engaging surfaces and bias the respective marginal portions of the film against guide surfaces provided on the main body portion of the camera housing. When the channel is empty, the carrier abuts against the rear side of the pressure plate.

10 Claims, 3 Drawing Figures

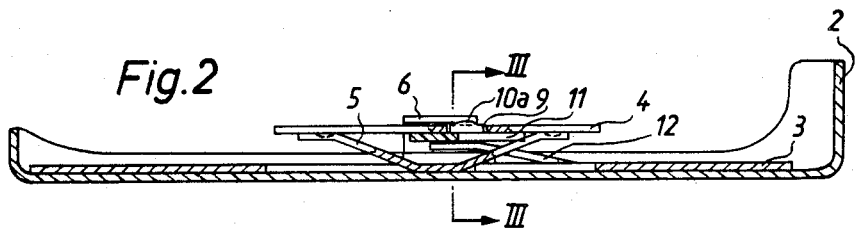
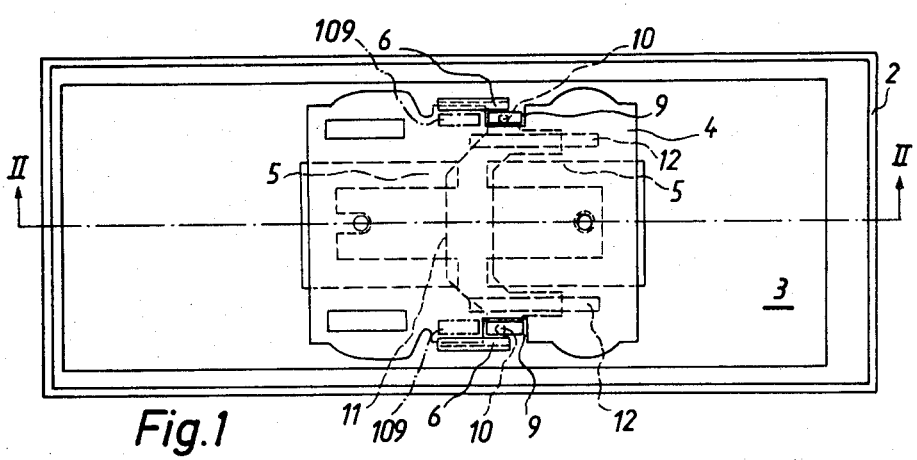
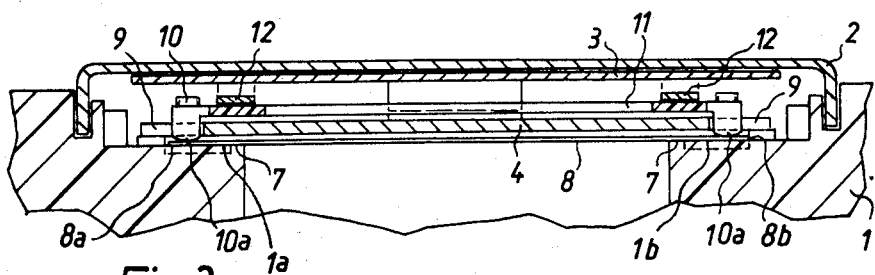
INVENTOR
DIETER ENGELSMANN
FRITZ KESSLER
DIETER MAAS
KURT ZATTLER
BY: Michael S. Striker
ATTORNEY

PHOTOGRAPHIC APPARATUS WITH BRAKING MEANS FOR ROLL FILM

BACKGROUND OF THE INVENTION

The present invention relates to photographic apparatus in general, especially to still cameras, and more particularly to improvements in photographic apparatus wherein the film frames which are located behind the picture taking lens are engaged by a pressure plate to lie flat in the focal plane of the lens.

It is well known to mount the pressure plate of a still camera on the movable cover or rear wall of the housing and to provide on such rear wall one or more springs which bias the pressure plate against the film frame behind the picture taking lens. The film is guided in a channel which extends between the lens and the pressure plate and confines the film against lateral movement during transport from the supply reel to the takeup reel or vice versa, depending upon whether the film is being transported forwardly during the intervals between successive exposures or rearwardly to be returned onto the core of the supply reel.

Spring-biased pressure plates insure satisfactory guidance of roll film in high-priced cameras wherein the component parts of the film transporting mechanism (such as sprocket wheels, gears and the like) are machined with a high degree of precision. However, the action of a conventional pressure plate is much less satisfactory in relatively inexpensive photographic apparatus wherein the component parts of the film transporting mechanism often consist of synthetic plastic material and are mass-produced by extrusion molding or another mass-producing method. Such plastic components are not finished with a high degree of precision so that the interengaging movable parts of the film transporting mechanism invariably allow for a certain amount of clearance which in turn enables the roll film to shift back and forth between successive transports in the channel in front of the pressure plate. The customary tendency of roll film to curl contributes to such uncontrolled movements which cause undesirable variations in the width of spaces (known as frame lines) between successive exposed film frames.

It was already proposed to eliminate such uncontrolled lengthwise movements of roll film by replacing the customary open film channel with a closed channel wherein the film is guided with minimal clearance. However, such closed film channels exhibit another serious drawback, namely, that the film transporting mechanism must exert upon the film a much higher force in order to overcome the friction between the surfaces bounding the closed channel and the film. This is undesirable for a number of reasons, for example, because the film is likely to tear in the region of perforations and the surfaces surrounding the channel are likely to scratch the emulsion side of the film.

SUMMARY OF THE INVENTION:

An object of the invention is to provide a photographic apparatus wherein the roll film is caused to move lengthwise in an open channel in front of the pressure plate but is unable to perform uncontrolled lengthwise movements even if the parts of the film transporting mechanism are mass-produced with a relatively low degree of precision.

Another object of the invention is to provide a photographic apparatus with novel and improved means for preventing uncontrolled shifting of roll film in an open film channel behind the picture taking lens.

A further object of the invention is to provide a photographic apparatus wherein the roll film can be properly guided and held against uncontrolled stray movements, especially in the longitudinal direction (from the supply reel toward the takeup reel or vice versa), even if the parts of the film transporting mechanism consist of synthetic plastic material and cooperate with each other with a certain amount of play.

In accordance with a feature of the invention, the improved photographic apparatus comprises a housing or body defining an elongated open film channel for lengthwise transport of photographic roll film, a spring-biased pressure plate adjacent to one side of the channel (namely, to that side which is remote from the picture taking lens) and having at least two apertures adjacent to different marginal portions of roll film in the channel, and braking members mounted in the housing and extending through the apertures of the pressure plate and into the channel to engage and to apply a relatively small but sufficient braking force against the respective marginal portions of the film in the channel.

The braking members are preferably provided with convex film-engaging surfaces and can be mounted on a plate-like carrier which is located behind the pressure plate and is mounted in the housing on one or more leaf springs serving to bias the carrier against the rear side of the pressure plate in the absence of film in the channel and to bias the braking members against the respective marginal portions of the film when the latter is located in the channel.

The housing of the photographic apparatus preferably comprises a main body portion which defines the channel and is provided with guide surfaces against which the marginal portions of the film in the channel are caused to bear under the action of the braking members. The pressure plate and the carrier are preferably mounted on a movable wall of the housing.

The novel features which are considered as characteristic of the invention are set forth in particular in the appended claims. The improved photographic apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a view of the movable wall of the housing of a photographic apparatus as seen in the direction of light penetration through the picture taking lens, showing the front side of the pressure plate and the braking members which extend through apertures provided in the marginal portions of the pressure plate;

FIG. 2 is a horizontal sectional view as seen in the direction of arrows from the line II—II of FIG. 1; and FIG. 3 is an enlarged transverse vertical sectional view as seen in the direction of arrows from the line III—III of FIG. 2.

DESCRIPTION OF THE PREFERRED EMBODIMENTS

Referring to the drawing in detail, the photographic apparatus comprises a housing which includes a main body portion 1 (shown in FIG. 3) and a movable rear wall or cover 2 which separably or pivotably mounted on the main body portion 1 in the customary way so that it can afford access to the interior of the housing for the purpose of inserting or removing photographic roll film 8.

The front side or inner side of the movable wall 2 of the housing is provided with a plate-like support 3 preferably consisting of elastomeric metallic material and having one or more forwardly extending strip-shaped portions 5 which are preferably formed by stamping and constitute biasing means or springs for a pressure plate 4. The support 3 is further provided with forwardly extending stops 6 which limit the extent of forward movement of the pressure plate 4 in a direction away from the movable wall 2 and toward the picture taking lens (not shown) which is mounted in the main body portion 1. The stops 6 can be provided on the movable wall 2.

The main body portion 1 defines an elongated open film channel 7 wherein the roll film 8 can be transported lengthwise in a first direction (from the supply reel toward the takeup reel) or in a second direction. The film transporting mechanism may comprise one or more sprockets or the like, not shown, which can be mass-produced from synthetic plastic material so that they exhibit certain tolerances which, in the absence of remedial measures, would allow the film 8 to perform uncontrolled (stray) movements, particularly in a direction from the supply reel toward the takeup reel, or visa versa. Such stray movements are likely to take place due to the natural tendency of roll film to curl.

When the movable wall 2 of the camera housing is held in the normal or closed position, the front surface of the pressure plate 4 is adjacent to the rear side of the film channel 7 to flatten that frame of the film 8 which is located behind the picture taking lens. Due to the aforementioned tendency of film to perform uncontrolled lengthwise movements, particularly if the film transporting mechanism consists of mass-produced parts which are produced and assembled with a certain amount of clearance, the pressure plate 4 is unable to insure that the width of frame lines between successive exposed film frames remains constant.

In order to prevent uncontrolled movements of roll film 8 in the channel 7 without unduly increasing the magnitude of forces which must be applied to the film transporting mechanism in order to advance the film lengthwise, the photographic apparatus further comprises one or more pairs of braking members 10 which have convex film-engaging surfaces 10a (see FIGS. 2 and 3) and are biased against the marginal portions 8a, 8b of film 8 in the channel 7 so as to urge such marginal portions against relatively narrow guide surfaces 1a, 1b of the main body portion 1. Such guide surfaces are located opposite suitably configurated apertures or cutouts 9 which are provided in the marginal portions of the pressure plate 4 so as to allow the convex surfaces 10a of the braking members 10 to extend into the channel 7 and to bear against the respective marginal portions 8a, 8b of the film with a relatively small force which suffices to insure that the braking members 10, in cooperation with the guide surfaces 1a, 1b of the main body portion 1, prevent stray lengthwise movements of film 8 in the channel 7. The arrangement is preferably such that the increased resistance which the film 8 offers to lengthwise movement in response to actuation of a relatively simple and inexpensive transporting mechanism does not substantially exceed the resistance which is offered by film that is being transported in an open channel without braking members.

The apertures 9 of the pressure plate 4 are preferably mirror symmetrical with reference to the central longitudinal symmetry plane (see the section line II—II of FIG. 1) of the film 8 in the channel 7, and such apertures are sufficiently remote from this symmetry plane to insure that the convex surfaces 10a of the braking members 10 engage those portions of the film 8 which are outwardly adjacent to the exposed film frames. The braking members 10 are mounted on or made integral with a plate-like carrier 11 which is mounted on the movable wall 2 behind the pressure plate 4 and is biased forwardly (toward the rear surface of the pressure plate 4) by one or more parallel leaf springs 12. The springs 12 are secured to or made integral with the aforementioned support 3 or with the movable wall 2. If desired, the leaf springs 12 can be made integral with the carrier 11 and with the braking members 10, and such unitary structure may consist of metallic or synthetic plastic material. At the present time, we prefer to make the springs 12 integral with the support 3 (e.g., such springs may constitute stamped strip-shaped portions which are bent forwardly from the general plane of the support 3 and are secured to the rear side of the carrier 11) and to make the carrier 11 integral with the braking members 10. When the film 8 is removed from the channel 7, the springs 12 bias the carrier 11 against the rear side of the pressure plate 4 and the surfaces 10a of the braking members 10 extend through the apertures 9 and well beyond the front side of the pressure plate. When the film 8 is introduced into the channel 7, the carrier 11 is preferably slightly spaced from the pressure plate 4 and the marginal portions 8a, 8b of the film are biased by convex surfaces 10a against the respective guide surfaces 1a, 1b of the main body portion 1 of the housing.

In the illustrated embodiment, the braking members 10 are of a polygonal (rectangular) cross-sectional shape (see particularly FIG. 1) and their surfaces 10a are elongated narrow convex surfaces. However, it is equally possible to employ substantially cylindrical braking members with hemispherical film engaging surfaces or to employ substantially spherical braking members. It is preferred to precision-finish the surfaces on the braking members so as to reduce friction and to thus insure that the film transporting mechanism can be actuated with minimal effort. Also, such precision-finished (polished) film engaging surfaces are less likely to scratch the film but are still capable of preventing uncontrolled stray movements in the longitudinal direction of the channel 7.

The reference characters 109 denote in FIG. 1 two additional apertures each of which is aligned with one of the apertures 9 and each of which serves to permit passage of an additional braking member (not shown) provided on the carrier 11 or on a separate carrier. Thus, each of the two marginal portions 8a, 8b of film 8 in the channel 7 can be braked by more than one braking member to thus further reduce the likelihood of stray movements.

Without further analysis, the foregoing will so fully reveal the gist of the present invention that others can, by applying current knowledge, readily adapt it for various applications without omitting features which fairly constitute essential characteristics of the generic and specific aspects of our contribution to the art, and, therefore, such adaptations should and are intended to be comprehended within the meaning and range of equivalence of the claims.

What is claimed as new and desired to be protected by Letters Patent is set forth in the appended claims:

1. In a photographic apparatus, a combination comprising a housing defining an elongated channel for lengthwise transport of photographic film; a spring-biased pressure plate adjacent to one side of said channel, said pressure plate having at least two apertures adjacent to different marginal portions of the film in said channel; and braking members mounted in said housing and extending through said apertures and into said channel to engage and to apply a braking force against the respective marginal portions of the film to thereby hold the film against uncontrolled lengthwise movement in said channel.

2. A combination as defined in claim 1, further comprising biasing means for yieldably urging said braking members into said channel.

3. A combination as defined in claim 1, wherein said braking members have convex film-engaging surfaces.

4. A combination as defined in claim 1, wherein said housing is provided with guide surfaces located opposite said braking members so that said braking members urge the respective marginal portions of the film in said channel against such guide surfaces.

5. A combination as defined in claim 1, wherein said housing comprises a main body portion and a wall movable with reference to said main body portion, said pressure plate and said braking members being mounted on said wall.

6. A combination as defined in claim 5, wherein said braking members are arranged to urge the respective marginal portions of the film in said channel against said main body portion of said housing.

7. A combination as defined in claim 1, wherein said pressure plate is provided with a plurality of apertures along each side of said channel and the number of said braking members equals the number of said apertures.

8. In a photographic apparatus, a combination comprising a housing defining a channel for lengthwise transport of photographic film; a spring-biased pressure plate adjacent to one side of said channel, said pressure plate having at least two apertures adjacent to different marginal portions of the film in said channel; braking members mounted in said housing and extending through said apertures and into said channel to engage and to apply a braking force against the respective marginal portions of the film in said channel; a carrier supporting said braking members; and biasing means disposed between said carrier and said housing to bias said carrier against said pressure plate in the absence of film in said channel and to bias said braking members against the respective marginal portions of the film when such film is located in said channel.

9. A combination as defined in claim 8, wherein said carrier is a plate.

10. A combination as defined in claim 8, wherein said biasing means comprises at least one leaf spring.

* * * * *